United States Patent
Galloway

(10) Patent No.: US 6,388,575 B1
(45) Date of Patent: May 14, 2002

(54) ADDRESSABLE UNDERGROUND MARKER

(75) Inventor: George G. Galloway, Weatherford, TX (US)

(73) Assignee: Industrial Technology, Inc., Mineral Wells, TX (US)

( * ) Notice: Subject to any disclaimer, the term of this patent is extended or adjusted under 35 U.S.C. 154(b) by 0 days.

(21) Appl. No.: 09/704,846

(22) Filed: Nov. 2, 2000

Related U.S. Application Data
(60) Provisional application No. 60/163,925, filed on Nov. 5, 1999.

(51) Int. Cl.[7] ............................................. G08B 13/14
(52) U.S. Cl. ................. 340/572.1; 324/329; 340/572.5; 340/572.7; 340/572.8
(58) Field of Search ........................... 340/572.1, 572.5, 340/572.7, 572.8, 505, 10.1, 10.4, 825.49, 551; 324/329, 326

(56) References Cited

U.S. PATENT DOCUMENTS

| | | |
|---|---|---|
| 3,373,498 A | 3/1968 | Chabbert |
| 3,683,389 A | 8/1972 | Hollis |
| 3,689,885 A | 9/1972 | Kaplan et al. |
| 3,719,950 A | 3/1973 | Bukhman et al. |
| 3,818,487 A | 6/1974 | Brody et al. |
| 3,836,842 A | 9/1974 | Zimmerman et al. |
| 3,938,044 A | 2/1976 | Lichtblau |
| 3,983,552 A | 9/1976 | Bakeman, Jr. et al. |
| 4,118,693 A | 10/1978 | Novikoff |
| 4,119,908 A | * 10/1978 | Cosman et al. ............. 324/326 |

(List continued on next page.)

OTHER PUBLICATIONS 23 mm Glass Encapsulated Transponder Reference Manual, Texas Instruments Registration and Identification System (TIRIS), Jul. 25, 1996, pp. 1–22.

Tag–it Radio Frequency Identification Systems brochure, Texas Instruments, 2000, 13 pages.

*Primary Examiner*—Thomas Mullen
(74) *Attorney, Agent, or Firm*—Geoffrey A. Mantooth

(57) ABSTRACT

An underground marker and methodology for locating the same is discussed. The marker has a tuned circuit and an energy storage device. The marker also has a transponder that is coupled to the tuned circuit. When the tuned circuit receives electromagnetic energy at its tuned frequency, the tuned circuit resonates and provides power to the energy storage device, which in turn powers a transponder. The transponder has a memory containing a coded signal. The transponder transmits this coded signal using the tuned circuit. The transponder alters the impedance of the tuned circuit in accordance with the coded pattern. In this manner, an addressable underground marker can be used to locate particular types of buried structures. Nonaddressable markers can be used to locate addressable markers by providing a reference point for searches.

12 Claims, 4 Drawing Sheets

U.S. PATENT DOCUMENTS

| | | |
|---|---|---|
| 4,240,072 A | 12/1980 | Fowler |
| 4,260,983 A | 4/1981 | Falck et al. |
| 4,292,590 A | 9/1981 | Wilson |
| 4,293,816 A | 10/1981 | Johnson |
| 4,334,227 A | 6/1982 | Marks |
| 4,342,904 A | 8/1982 | Onasager |
| 4,482,513 A | 11/1984 | Auletti |
| 4,581,524 A | 4/1986 | Hoekman et al. |
| 4,668,912 A | 5/1987 | Junker |
| 4,712,094 A | 12/1987 | Bolson, Sr. |
| 4,761,656 A | 8/1988 | Cosman et al. |
| 4,767,237 A * | 8/1988 | Cosman et al. ......... 324/326 X |
| 4,798,175 A | 1/1989 | Townsend |
| 4,859,991 A | 8/1989 | Watkins et al. |
| 4,864,749 A | 9/1989 | Brown |
| 4,866,388 A | 9/1989 | Cosman et al. |
| 4,873,530 A | 10/1989 | Takeuchi et al. |
| 4,873,533 A * | 10/1989 | Oike .................... 324/329 X |
| 4,894,663 A | 1/1990 | Urbish et al. |
| 4,925,605 A | 5/1990 | Petronko |
| 5,017,415 A | 5/1991 | Cosman et al. |
| 5,028,918 A | 7/1991 | Giles et al. |
| 5,045,368 A * | 9/1991 | Cosman et al. ......... 324/326 X |
| 5,047,715 A | 9/1991 | Morgenstern |
| 5,057,844 A | 10/1991 | Rothstein |
| 5,103,234 A | 4/1992 | Watkins et al. |
| 5,116,654 A | 5/1992 | Cosman et al. |
| 5,121,103 A | 6/1992 | Minasy et al. |
| 5,140,334 A | 8/1992 | Synder et al. |
| 5,211,129 A | 5/1993 | Taylor et al. |
| 5,258,766 A | 11/1993 | Murdoch |
| 5,270,717 A | 12/1993 | Schuermann |
| 5,276,067 A | 1/1994 | Doerge |
| 5,280,296 A | 1/1994 | Tan et al. |
| 5,281,941 A | 1/1994 | Myatt |
| 5,326,095 A * | 7/1994 | Dudley ............... 340/323 R X |
| 5,397,986 A | 3/1995 | Conway et al. |
| 5,426,443 A | 6/1995 | Jenness, Jr. |
| 5,497,099 A | 3/1996 | Walton |
| 5,499,015 A | 3/1996 | Winkler et al. |
| 5,532,598 A * | 7/1996 | Clark, Jr. et al. ........... 324/326 |
| 5,539,421 A | 7/1996 | Hong |
| 5,585,811 A | 12/1996 | Jetzer |
| 5,592,182 A | 1/1997 | Yao et al. |
| 5,699,048 A | 12/1997 | Galloway |
| 5,814,986 A | 9/1998 | Goskowicz et al. |
| 5,825,298 A | 10/1998 | Walter |
| 5,920,194 A * | 7/1999 | Lewis et al. ................. 324/326 |
| 5,999,107 A | 12/1999 | Cooper et al. |
| 6,049,279 A | 4/2000 | Minarovic |
| 6,097,189 A * | 8/2000 | Arndt et al. ................. 324/326 |
| 6,097,293 A | 8/2000 | Galloway |
| 6,133,738 A * | 10/2000 | Minarovic .................. 324/326 |
| 6,271,667 B1 | 8/2001 | Minarovic |

* cited by examiner

ADDRESSABLE UNDERGROUND MARKER

SPECIFICATION

This application is a continuation-in-part of application Ser. No. 60/163,925, filed Nov. 5, 1999.

FIELD OF THE INVENTION

The present invention relates to electrical markers that are located underground for the purpose of locating buried structures.

BACKGROUND OF THE INVENTION

Buried structures include pipelines, cables, etc. Once a structure is buried in the ground, it becomes difficult to locate. Location is useful, for example, to dig up the structure for repair or to avoid the structure when performing nearby excavation.

Electrical markers are used to locate buried structures. The markers are located adjacent to a structure and then are buried with that structure.

In the prior art, each marker contains one or more tuned LC circuits. Each circuit typically includes a coil of wire. In order to locate a buried marker, an operator moves across the surface of the ground with a transmitter and a receiver. The transmitter sends out an electromagnetic signal tuned to the frequency of the marker. Upon receiving the transmitted signal, the marker resonates and thus produces an electromagnetic response. This response is received by the above ground receiver and converted to a signal that is detectable by the operator (for example, an audio tone). The operator marks the pinpointed location on the ground using paint and then moves on to find the next marker buried along the structure.

Thus, with the prior art, the location of the marker and the location of the buried structure can be determined.

In the prior art, each utility has a particular frequency of marker. For example, a marker intended for use by a water utility is made to operate at a first frequency, while a marker intended for use by a telephone utility is made to operate at a second frequency. Thus, it is possible to distinguish between a telephone utility buried structure (for example, a cable) and a water utility buried structure (for example, a water pipe) by the frequency of the buried markers.

Buried structures can be nonuniform and have substructures that are of interest. For example, a buried telephone cable can have a splice. Locating the splice with prior art markers is difficult. This is because it is difficult to identify a particular one of the many markers that may be buried along the length of the cable. Each marker is virtually indistinguishable from the other marker except by its location.

It is desirable to have an underground marker that can be distinguished from all of the other underground markers that lie along the same buried structures. Such a marker would allow the location of particular substructures, such as a splice, a vault hatch, a valve, etc.

SUMMARY OF THE INVENTION

It is an object of the present invention to provide an electrical marker for use in locating buried structures, which marker can be specifically identified.

It is another object of the present invention to provide an electrical marker for use in locating buried structures, which marker is addressable.

The present invention provides an apparatus for use in locating buried structures. The apparatus has a tuned circuit having an inductance and a capacitance. An energy storage device is connected to the tuned circuit. A transponder has a power input that is connected to the energy storage device and a trigger input connected to the tuned circuit. The transponder has a memory for containing and identifying code. The transponder has an output that is connected to the tuned circuit. The transponder operates to transmit by way of the tuned circuit the identifying code when the trigger input is activated.

In accordance with one aspect of the present invention, the inductor is a flat circular coil.

In accordance with another aspect of the present invention, the transponder comprises a shift register.

In accordance with still another aspect of the present invention, the apparatus further comprises a phase shift transmitter coupled to the transponder output and to the tuned circuit.

In accordance with still another aspect of the present invention, the apparatus further comprises a waterproof housing surrounding the tuned circuit, the energy storage device and the transponder.

In accordance with another aspect of the present invention, the tuned circuit is a first tuned circuit. The apparatus further comprises a second tuned circuit with a second transponder electrically coupled thereto. The first and second tuned circuits are nonplanar with respect to each other.

In accordance with still another aspect of the present invention, the apparatus further comprises a third tuned circuit with a third transponder electrically coupled thereto. The first, second and third tuned circuits are nonplanar with respect to each other.

The invention provides a method of identifying a buried structure. A tuned circuit having an impedance is provided. The tuned circuit is tuned to a selected frequency. Electromagnetic energy at the selected frequency is received by way of the tuned circuit, wherein the tuned circuit resonates. The resonating in the tuned circuit is interrupted in accordance with a coded pattern.

In accordance with one aspect of the method, the step of interrupting the resonating of the tuned circuit in accordance with a coded pattern further comprises the step of changing the impedence of the tuned circuit in accordance with the coded pattern.

In accordance with another aspect of the present invention, the method further comprises the step of burying the tuned circuit adjacent to the buried structure before the step of receiving electromagnetic energy.

There is also provided the method of identifying a buried structure in the ground. A buried first marker is provided adjacent to the structure. The marker has an identifying code and a transponder. A second marker is buried some distance away from the structure. The ground is subjected to electromagnetic energy at a selected frequency. A second response is obtained from the second marker so as to locate the second marker. The ground is subjected to the electromagnetic energy, searching from the location of the second marker for the first marker. Then, the identifying code in the first response is detected so as to locate the first marker.

DESCRIPTION OF THE PREFERRED EMBODIMENT

The disclosure of my earlier U.S. Pat. No. 5,699,048 is hereby incorporated by reference.

Figure 1:
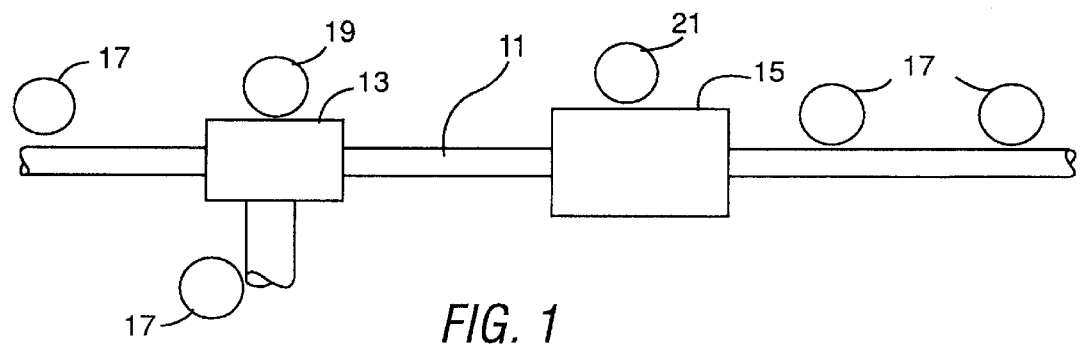
FIG. 1 is a schematic plan view of a buried structure with markers of the present invention adjacent thereto.

In FIG. 1, there is shown a diagram of a buried structure 11. The buried structure 11 shown could be a cable, a pipeline, etc. The buried structure 11 has substructures 13, 15 which are of interest. For example, in a cable, there are enclosures 13, splices 15, etc. For a water pipe, there are T-fittings 13, valves 15, etc.

Markers 17, 19, 21 are buried with the structure 11. The markers are located adjacent to the structure. Some of the markers 17 are conventional and may be such as are disclosed in my U.S. Pat. No. 5,699,048. These markers resonate at a selected frequency and provide information on the location of the buried structure. The other markers 19, 21 located adjacent to the substructures 13, 15 are addressable in that they provide a unique identification code. For example, the marker 19 that is buried next to the substructure 13 will provide a first identification code (for example, binary 10010011) when prompted. The marker 21 that is buried next to the substructure 15 will provide a second identification code (for example, binary 11100010) when prompted. With the unique identification code, an operator can identify a particular marker 19, 21 among the many buried markers 17, 19, 21 and can thus pinpoint the location of the substructure relative to the remainder of the buried structure.

For example, a telephone cable splice 15 may be identified in telephone company records as number 8321 located at the intersection of Throckmorton and Fifth Streets (or in the alternative as being located at specific Global Positioning System coordinates or other mapping coordinates). A marker 21 having a unique identification code is located adjacent to the splice 15. The specific location of the splice can be determined when that marker is found by an operator who utilizes surface equipment.

Other markers, whether they provide a unique code or merely a resonant signal common to other markers, can be used to "home" in on the particular marker of interest and thus to the particular substructure of interest. For example, the operator can locate a marker 17. Once located, the operator can continue along the length of the cable using the other markers 17 along the way until reaching the marker 19 or 21 of interest. Alternatively, the Global Positioning System (GPS) can be used to find the approximate location of the marker (if the GPS coordinates are known), wherein the exact location of the marker can then be determined using the techniques discussed herein.

Figure 2:
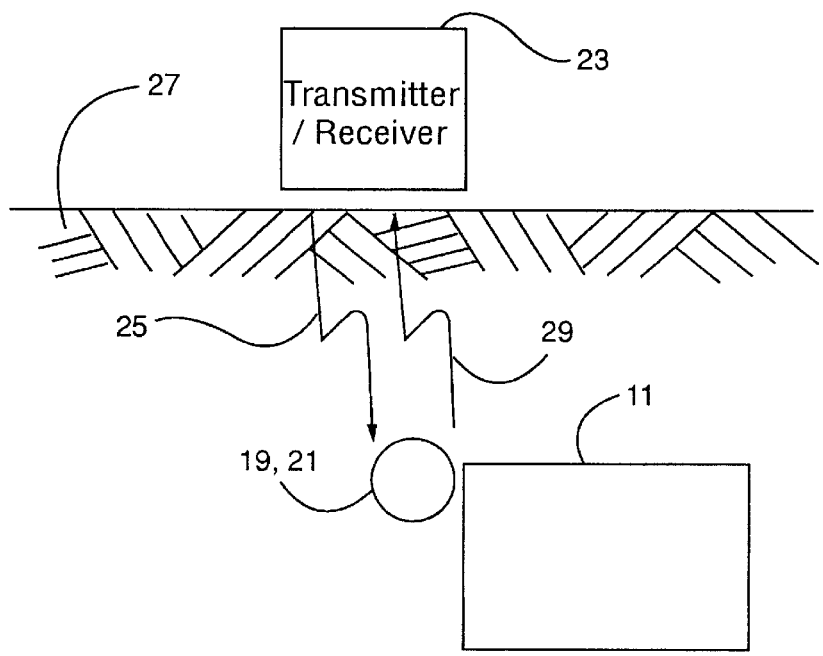
FIG. 2 is a schematic elevational view of a cross-section of earth, showing the use of the present invention.

FIG. 2 shows in general the operation of the marker system. The marker 19, 21 is first buried adjacent to the structure 11. After burial, the marker can be located by surface equipment 23. The surface equipment 23 utilized by an operator contains a transmitter and a receiver (or a transceiver) and is located above the ground or the earth 27. The transmitter produces a signal 25 at the frequency of interest. This signal penetrates the earth 27 and impinges on the marker 19. The marker 19 has an antenna that receives the signal. Inside of the marker is a transponder that transmits the unique identification signal 29 back to the surface equipment. On the surface, the surface equipment 23 receives the signal 29 and processes it to extract the identification code that is associated with that marker. Identifying information about the marker 19 is then provided to the operator in visual, audible, or other forms.

The identifying code can be unique to a single marker. Alternatively, the identifying code can be unique to a group of markers, such as for those markers that are to be used adjacent to valves.

Figure 3:
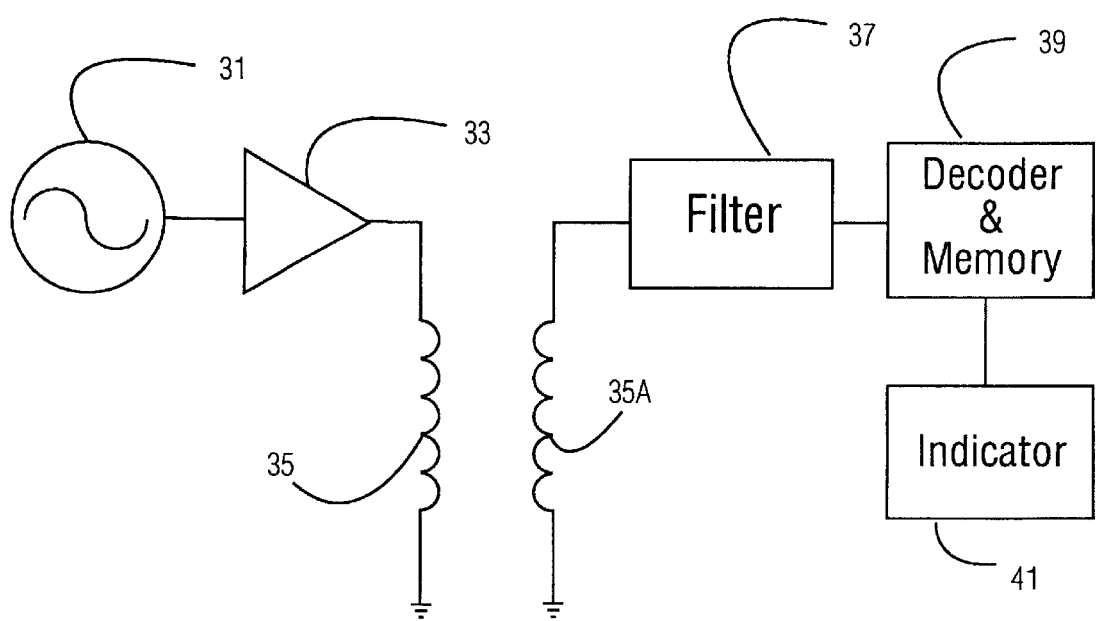
FIG. 3 is a block diagram of a transmitter and receiver that is used to locate a marker.

In FIG. 3, there is shown a schematic block diagram of the surface transmitter and receiver 23. The transmitter portion has a signal generator 31. The output of the generator is connected to an amplifier 33, which in turn is connected to an antenna 35, such as a coil. The signal generator 31 produces a signal (such as a sine wave) at the frequency of interest. If desired, the transmitter can produce plural signals, each at a selected frequency. The receiver portion is connected to an antenna 35A (or to the antenna 35) and has a filter 37 connected thereto. The filter 37 can be a bandpass filter that excludes noise above and below the frequency band of interest. The output of the filter 37 is connected to a decoder or demodulator 39. The decoder 39, which has memory, extracts the coded information from the marker signal 29. The signal may have header information or other information, which is decoded using information in the memory. The output of the decoder is connected to an indicator 41. The indicator provides an audible or visual indication of the marker's identity. For example, the coded information can be converted into a base 10 (ten) number, which is then provided to the operator. The number can then be correlated to the particular buried structure that is marked by the marker. One or more bits of the coded information can be used to identify characteristics of the buried structure. For example, a segment of the code can be used to identify the buried structure as a valve or a splice, or as a water utility structure.

Figure 4:
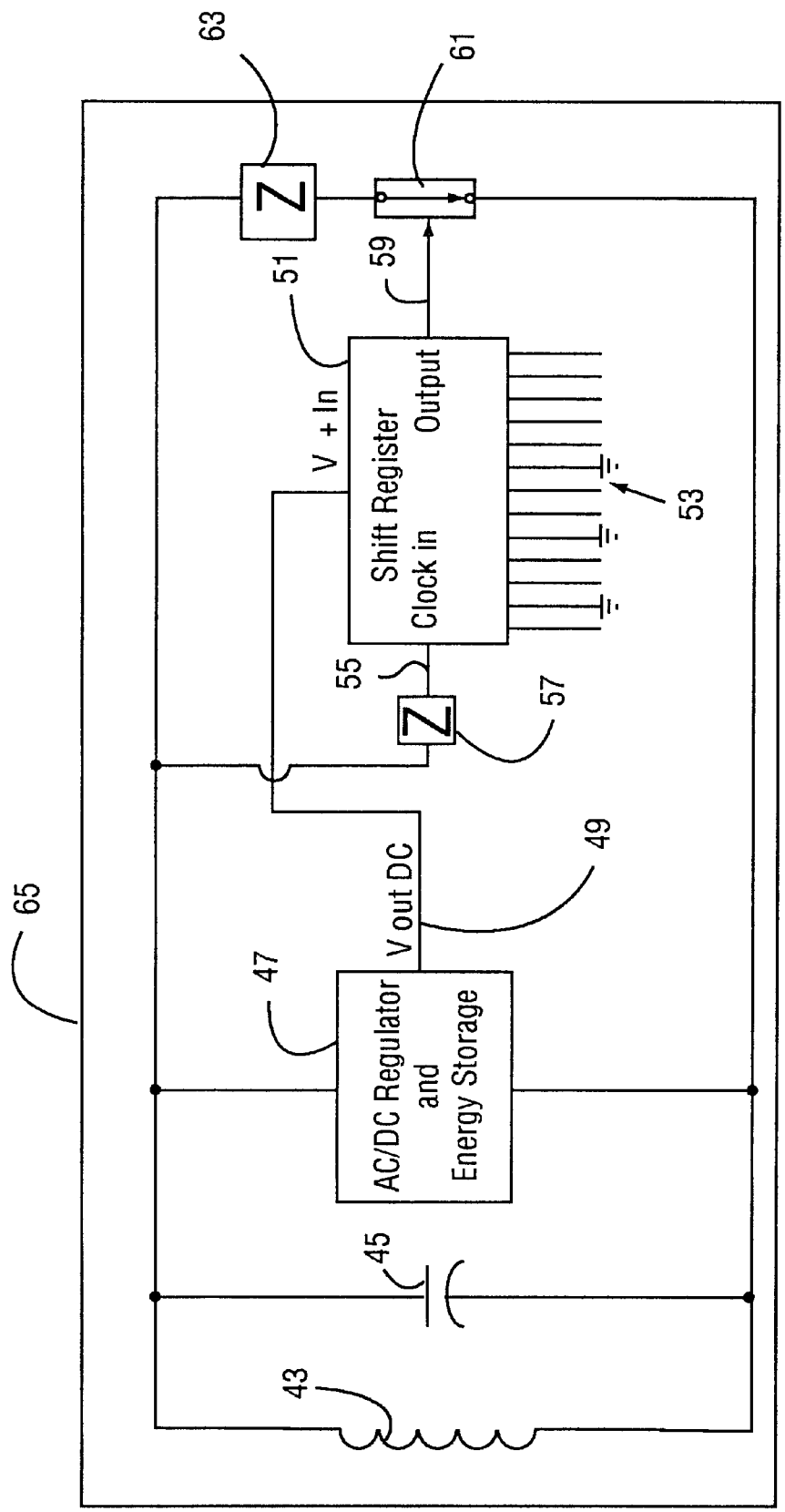
FIG. 4 is a block diagram of the marker.

FIG. 4 illustrates the transponder electronics located inside of a marker 19, 21. FIG. 4 is exemplary, as other types of transponders can be used. For example, a transponder is described in U.S. Pat. No. 5,211,129, the disclosure of which is incorporated herein by reference.

The marker has an antenna 43 in the form of a coil. A capacitor 45 is connected in parallel with the coil 43 to make an LC circuit 43, 45 that is tuned to the frequency of the generator 31. Connected in parallel with the tuned LC circuit is an ac/dc regulator and energy storage device 47. For example, the device 47 can be a relatively large capacitor that can be used to store energy received by the LC circuit. The device 47 has a diode that rectifies and regulates the energy. The output 49 of the regulator and energy storage device 47 is a dc voltage.

A rotating type of shift register 51 is provided. The regulator and energy storage device 47 powers the shift register 51. The shift register 51 has programmable inputs 53, which allow a string of data bits ($D_N$) to be programmed therein. The inputs can be programmed, for example, by being open or grounded. The shift register has a clock, or trigger, input 55 that is connected to the LC circuit 43, 45. A voltage limiter 57 can be provided in series with the input 55 if needed. The output 59 of the shift register 51 is connected to a switch 61. The switch 61 and an impedance 63 (such as a small capacitor) are connected across the LC circuit 43, 45. When the switch 61 is closed, continuity is provided and the impedance is connected across the LC circuit. When the switch 61 is open, continuity is broken and the impedance is no longer connected across the LC circuit. The switch 61 is operable between its open and closed positions by the output 59 of the shift register 51.

The electronics are contained within a waterproof housing 65.

In operation, when the signal 25 (see FIGS. 2 and 4) from the surface transmitter impinges on the marker 19, 21, the LC circuit 43, 45 receives the signal and resonates. The regulator and energy storage device 47 captures some of the resonant energy in order to power the shift register 51.

Once the shift register 51 becomes powered, it can operate the switch 61 according to the coded format as represented by its stored data bits. When the received signal from the LC circuit 43, 45 is sufficiently high in amplitude, the clock input 55 is triggered and one bit is provided to the output 59. The output 59 operates the switch depending on the value of the bit. The received signal provided to the clock input goes low because of the ac nature of the signal. When the received signal becomes once again sufficiently high in amplitude, then the clock input 55 is triggered and the next bit in the shift register is provided to the output. The data bits and the shift register are thus provided in a sequential manner to operate the switch 61.

The switch 61 is operated in accordance with the value of the bit on the output 59 of the shift register. For example, if the bit is a "1", then the switch is closed; if the bit is a "0", the switch is opened.

When the switch 61 is closed, the impedance 63 is connected across the LC circuit 43, 45. The signal 29 (see FIG. 2) produced by the resonating LC circuit shifts in phase due to the added impedance. If the switch 61 is open, the impedance is disconnected from the LC circuit and there is no phase shift or change in the signal 29. Thus, the code as represented by the bit sequence stored in the shift register is transmitted by the LC circuit as phase shifts. The decoder 39 in the surface equipment 23 detects these phase shifts in the signal 29.

The beginning of the coded information can be represented by a header. The header is a bit sequence that is common to each addressable marker. The shift register 51, being of the rotary type, can thus transmit the coded information a number of times until the energy provided by the regulator and energy storage device 47 becomes insufficient to operate the shift register 51. Thus, the coded information need not be transmitted with the header bits as the initial bits. Instead, the surface receiver utilizes the header to identify the beginning of the coded information. Alternatively, the shift register can output its string of bits once and then reset, so that the same bit is always transmitted first.

The code is programmed into the shift register during manufacture and before the housing 65 is sealed. The code can be imprinted onto the housing 65 for visual reference. This allows an installer to notate in a database which marker is installed where.

The transponder can have separate transmit and receive antennas/coils. Also, various types of encoding and modulation can be used by the transponder.

Figure 5:
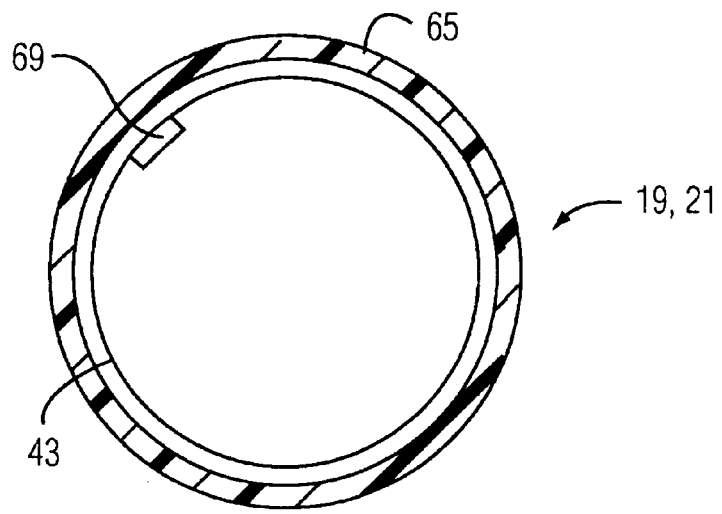
FIG. 5 is a plan cross-sectional view of the marker.

FIG. 5 shows a marker 19, 21 in accordance with a preferred embodiment. The coil 43 is relatively large, on the order of 2–4 inches. The coil of course can be smaller or larger, depending on the particular need. The electronics 69, which includes the capacitor 45 and the remaining components 47, 51, etc. as shown in FIG. 4, are located inside of the coil 43 and are electrically coupled to the coil as required. In order to minimize shock damage, the electronics 69 can be taped or otherwise secured to the coil 43. In addition, foam can fill the interior space of the coil. The coil 43 and the electronics 69 are put into the waterproof housing 65.

Figure 6:
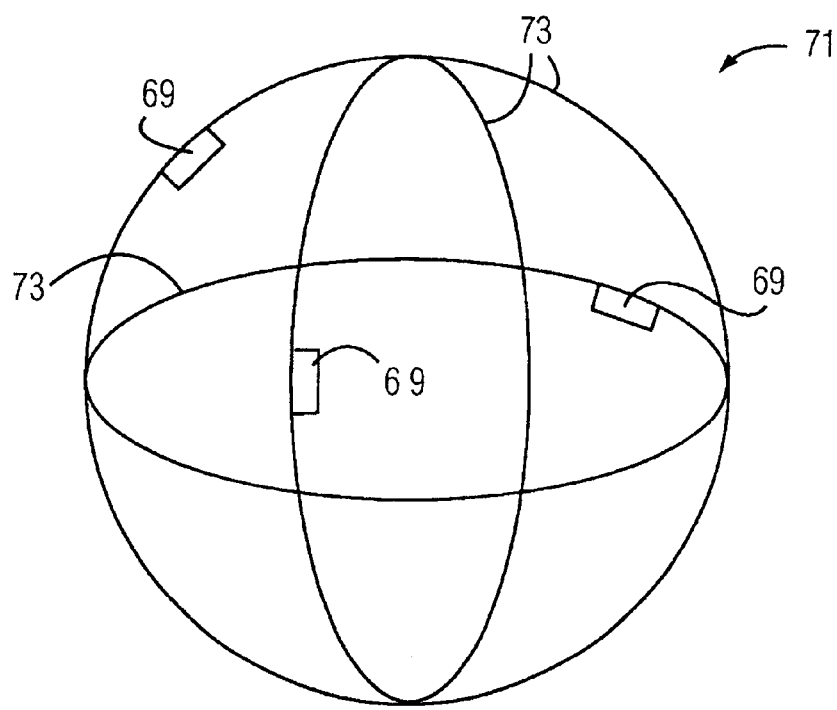
FIG. 6 is an isometric view of the marker, in accordance with a preferred embodiment.

FIG. 6 illustrates another embodiment of the marker 71 (the housing is not shown in FIG. 6). The marker has three orthogonal tuned circuits 73, as discussed in U.S. Pat. No. 5,699,048. This orthogonal arrangement provides an omni-directional response, which is particularly desired in buried markers. Each tuned circuit has electronics 69 coupled thereto. Thus, each tuned circuit has a transponder. The transponders in a single marker can all be programmed with the same coded information. Alternatively, the transponders in a single marker can have unique codes. Such a marker is useful in determining if the orientation in the marker and the surrounding structure has changed over time.

The foregoing disclosure and the showings made in the drawings are merely illustrative of the principles of this invention and are not to be interpreted in a limiting sense.

What is claimed is:

1. An apparatus for use in locating buried structures, comprising:
    a) a tuned circuit having an inductance and a capacitance;
    b) an energy storage device connected to the tuned circuit;
    c) a transponder having a power input that is connected to the energy storage device and a trigger input connected to the tuned circuit, the transponder having a memory for containing an identifying code, the transponder having an output that is connected to the tuned circuit, the transponder operating to transmit by way of the tuned circuit the identifying code when the trigger input is activated.

2. The apparatus of claim 1 wherein the inductor is a flat circular coil.

3. The apparatus of claim 1 wherein the transponder comprises a shift register.

4. The apparatus of claim 1 further comprising a phase shift transmitter coupled to the transponder output and to the tuned circuit.

5. The apparatus of claim 1 further comprising a waterproof housing surrounding the tuned circuit, the energy storage device and the transponder.

6. The apparatus of claim 1 further comprising:
    a) a phase shift transmitter coupled to the transponder output and to the tuned circuit;
    b) a waterproof housing surrounding the tuned circuit, the energy storage device and the transponder;
    c) the inductor is a flat circular coil;
    d) the transponder comprises a shift register.

7. The apparatus of claim 1 wherein the tuned circuit is a first tuned circuit, further comprising a second tuned circuit with a second transponder electrically coupled thereto, the first and second tuned circuits being nonplanar with respect to each other.

8. The apparatus of claim 7 further comprising a third tuned circuit with a third transponder electrically coupled thereto, the first, second and third tuned circuits being nonplanar with respect to each other.

9. A method of identifying a buried structure, comprising the steps of:
    a) providing a tuned circuit having an impedance, the tuned circuit being tuned to a selected frequency;
    b) receiving electromagnetic energy at the selected frequency by way of the tuned circuit, wherein the tuned circuit resonates;

c) interrupting the resonating of the tuned circuit in accordance with a coded pattern.

10. The method of claim 9 wherein the step of interrupting the resonating of the tuned circuit in accordance with a coded pattern further comprises the step of changing the impedance of the tuned circuit in accordance with the coded pattern.

11. The method of claim 9 further comprising the step of burying the tuned circuit adjacent to the buried structure before the step of receiving electromagnetic energy.

12. A method of identifying a buried structure in the ground, comprising the steps of:

a) providing a buried first marker adjacent to the structure, the marker having an identifying code and a transponder;

b) providing a buried second marker some distance away from the structure;

c) subjecting the ground to electromagnetic energy at a selected frequency;

d) obtaining a second response from the second marker, so as to locate the second marker;

e) searching from the location of the second marker for the first marker by subjecting the ground to the electromagnetic energy;

f) detecting the identifying code in a first response so as to locate the first marker.

* * * * *